(12) United States Patent
Zhou et al.

(10) Patent No.: US 12,185,726 B2
(45) Date of Patent: Jan. 7, 2025

(54) **METHOD FOR EFFICIENTLY COLLECTING AND PURIFYING *OROBANCHE CUMANA* (*O. CUMANA*) GERMINATION STIMULANTS USING AEROPONIC SYSTEM AND SOLID-PHASE EXTRACTION (SPE)**

(71) Applicant: ZHEJIANG UNIVERSITY, Zhejiang (CN)

(72) Inventors: Weijun Zhou, Zhejiang (CN); Luyang Hu, Zhejiang (CN); Chong Yang, Zhejiang (CN); Ling Xu, Zhejiang (CN); Na Zhang, Zhejiang (CN); Jiansu Wang, Zhejiang (CN); Jinwen Zhu, Zhejiang (CN); Quanjiang Bai, Zhejiang (CN); Xiaopeng Yun, Zhejiang (CN)

( * ) Notice: Subject to any disclaimer, the term of this patent is extended or adjusted under 35 U.S.C. 154(b) by 1032 days.

(21) Appl. No.: 17/260,159

(22) PCT Filed: Jun. 5, 2020

(86) PCT No.: PCT/CN2020/094641
§ 371 (c)(1),
(2) Date: Jan. 13, 2021

(87) PCT Pub. No.: WO2021/047216
PCT Pub. Date: Mar. 18, 2021

(65) Prior Publication Data
US 2022/0007655 A1    Jan. 13, 2022

(30) Foreign Application Priority Data

Sep. 12, 2019    (CN) .......................... 201910863755.7

(51) Int. Cl.
| | | |
|---|---|---|
| *A01N 65/12* | (2009.01) | |
| *A01G 22/60* | (2018.01) | |
| *A01G 31/02* | (2006.01) | |
| *A01N 43/08* | (2006.01) | |
| *A01N 43/12* | (2006.01) | |
| *B01D 11/02* | (2006.01) | |
| *B01D 15/18* | (2006.01) | |
| *B01D 15/20* | (2006.01) | |
| *B01D 15/32* | (2006.01) | |
| *B01D 15/42* | (2006.01) | |
| *B01D 21/26* | (2006.01) | |

(52) U.S. Cl.
CPC .............. *A01N 65/12* (2013.01); *A01G 22/60* (2018.02); *A01G 31/02* (2013.01); *A01N 43/08* (2013.01); *A01N 43/12* (2013.01); *B01D 11/0288* (2013.01); *B01D 11/0292* (2013.01); *B01D 15/1871* (2013.01); *B01D 15/20* (2013.01); *B01D 15/325* (2013.01); *B01D 15/426* (2013.01); *B01D 21/262* (2013.01)

(58) Field of Classification Search
None
See application file for complete search history.

(56) References Cited

FOREIGN PATENT DOCUMENTS

| | | |
|---|---|---|
| CN | 102870659 A | 1/2013 |
| CN | 106258881 A | 1/2017 |
| CN | 106508460 A | 3/2017 |
| CN | 109362546 A | 2/2019 |
| CN | 110583657 A | 12/2019 |

OTHER PUBLICATIONS

PCT/CN2020/094641 International Search Report dated Jul. 6, 2020.
CN110583657A—English machine translation of Abstract.
CN106508460A—English machine translation of Abstract.
CN102870659A—English machine translation of Abstract.
CN106258881A—English machine translation of Abstract.
CN109362546A—English machine translation of Abstract.
Ruihong, J., et al., Effect of Different Resistant Sunflower Varieties Root Exudates on Germination of Orobanche cumana Seeds; Acta Bot., Boreal, Occident. Sin., 2014, 34(7)-Abstract.
Fuli, H., et al., Research on Germination Mechanism of Orobanche cumana Wallr; Crops; Jun. 2012—Abstract.

*Primary Examiner* — Alton N Pryor
(74) *Attorney, Agent, or Firm* — Patrick M. Torre; Stites & Harbison PLLC (57) ABSTRACT

The patent discloses a method for efficiently collecting and purifying *Orobanche cumana* (*O. cumana*) germination stimulants using aeroponic system and solid-phase extraction (SPE), including the following steps: (1) sunflower seeds germination, then planting sunflower seedlings in aeroponic device, and cultivating the sunflower seedlings in the aeroponic system; at the aeroponic stage, phosphorus-containing aeroponic nutrient solution is first used to cultivate the sunflower seedlings for 20 to 25 days, and phosphorus-free aeroponic nutrient solution is then used instead to subject the sunflower seedlings to starvation cultivation for 5 to 7 days; and (2) passing all nutrient solutions in the aeroponic device through an SPE cartridge for SPE to extract *O. cumana* germination stimulants. The obtained *O. cumana* germination stimulants are diversified, and have high concentration and purity.

8 Claims, 10 Drawing Sheets

1. Cultivate seedlings with a plant nutrient solution in an aeroponic system, and collect germination stimuli Timing controller 2. Use SPE to purify and pre-concentrate the germination stimuli Solvent 1    Sample    Solvent 2    Solvent 3

Activation    Loading    Rinsing    Eluting

• Analyte
• Impurity

Solid particles

3. Use UHPLC-TQ-MS to separate and detect the components of germination stimuli

METHOD FOR EFFICIENTLY COLLECTING AND PURIFYING *OROBANCHE CUMANA* (*O. CUMANA*) GERMINATION STIMULANTS USING AEROPONIC SYSTEM AND SOLID-PHASE EXTRACTION (SPE)

This application is the national stage of international patent application no. PCT/CN2020/094641 filed on Jun. 5, 2020, the entirety of the contents of which is incorporated by reference herein.

The present application claims priority to Chinese patent No. 201910863755.7, filed to the China National Intellectual Property Administration (CNIPA) on Sep. 12, 2019 and entitled "METHOD FOR EFFICIENTLY COLLECTING AND PURIFYING *OROBANCHE CUMANA* (*O. cumana*) GERMINATION STIMULANTS USING AEROPONIC SYSTEM AND SOLID-PHASE EXTRACTION (SPE)", which is incorporated herein by reference in its entirety.

TECHNICAL FIELD

The disclosure relates to the technical field of plant cultivation and biochemistry, and in particular to a method for efficiently collecting and purifying *Orobanche cumana* (*O. cumana*) germination stimulants using aeroponic system and solid-phase extraction (SPE).

BACKGROUND

Sunflower is one of the most important oil crops in the world as well as one of the main oil crops in China. Sunflower has high economic value, easy management, low cost of planting, large benefit, and salt and alkali resistance, and is thus widely planted in Northeast China and Northwest China. The Inner Mongolia Autonomous Region has the largest sunflower production in China, followed by Xinjiang Uygur Autonomous Region. In recent years, with the increase of sunflower production, the parasitic weed *O. cumana* appeared in sunflower production areas, which seriously affects the sunflower production. Therefore, there is an urgent need to prevent and control the weed.

Parasitic plant refers to a plant that diverts nutrients and water from host plant to meet its own growth and development due to the degradation of roots and/or leaves or the lack of sufficient chlorophyll. Parasitic plants account for about 1% of angiosperms, which have a lifestyle that is completely different from the typical autotrophic plants. A parasitic plant acquires organic carbon sources in a heterotrophic manner, which is directly connected with vascular tissues in the roots or stems of a host plant using a special organ called haustorium. According to the dependence of parasitic plants on hosts, parasitic plants can mainly be divided into two categories: holoparasitic plants, such as *Cusuta chinensis* and *Orobanche* spp.; and semiparasitic plants, such as *Striga asiatica, Scurrula parasitica*, and *Viscum coloratum*. A holoparasitic plant has no leaves or has leaves that degenerate into scale shapes, which cannot conduct normal photosynthesis, and all nutrients that a holoparasitic plant needs are completely derived from its host. A semiparasitic plant possesses chlorophyll and can conduct normal photosynthesis, but often has degraded roots, whose vessels are directly connected with a host plant and absorb water and inorganic salts from the host plant.

*O. cumana* is a holoparasitic plant that parasitizes on roots of sunflower through haustorium. One mature *O. cumana* plant can produce an astonishing number of dusty seeds, ranging from 50,000 to 500,000. These seeds can remain vigorous in the soil for up to 10 years, which increases the chance that the seeds find a host. *O. cumana* is currently one of the biggest limiting factors for sunflower production in the world, which causes hazards mainly in Europe and Asia, especially in Spain, France, Turkey, Russia, Ukraine, Israel, Kazakhstan and China. The sunflower varieties planted in Europe and North and South Americas are mainly oil sunflowers, while the sunflower varieties planted in China are mainly edible sunflowers (confectionery sunflowers).

At present, *O. cumana* is prevented and controlled mainly by resistance breeding, chemical control, biological control, crop rotation using a trap crop, artificial mechanical weeding, and other methods. Breeding resistant varieties is an economical and effective prevention and control measure, but resistance breeding often progresses slowly, and sources of resistance are widespread in oil sunflowers, but rare in edible sunflowers. Moreover, the fast evolution of *O. cumana* increases the difficulty of breeding. Chemical control mainly targets the upper part of *O. cumana* above ground, which cannot effectively control *O. cumana*, may compromise the growth of subsequent crops, poses hazard to the environment. Biological control uses antagonistic microorganism such as *Penicillium griseofulvum* and *Streptomyces pactum* to inhibit the germination of *O. cumana*. Artificial mechanical weeding is only effective for a first-infested area.

A trap crop refers to a crop whose roots can secrete chemicals that stimulates the germination of *O. cumana* seeds, which however will not be parasitized by *O. cumana* and can be harvested normally. Due to the small size of *O. cumana* seeds, nutrients stored themselves are extremely limited. If *O. cumana* cannot parasitize the roots of a host within a few days after germination, it will die after the limited nutrients are exhausted, which is called "suicidal germination". Crop rotation can improve the physical and chemical properties of soil and reduce soil-borne fungal communities, which can effectively reduce plant diseases and insect pests. Studies have shown that flax, soybean, wheat, rice and corn can trigger the germination of *O. cumana* seeds. A number of experiments have shown that rotation of host plants and trap crops can reduce the amount of parasitic weeds.

Current researches found that the germination of parasitic plant seeds requires the stimulation of special chemicals, such as strigolactones. However, no active strigolactone has been found in sunflower root exudates. The *O. cumana* germination stimulants extracted from sunflower root exudates for the first time was identified as dehydrocostus lactone, which is a sesquiterpene lactone. Subsequent studies found that costunolide, tomentosin and 8-epixanthatin in sunflower root exudates can stimulate the germination of *O. cumana* seeds at nanomolar and micromolar concentrations. The active concentrations of these germination stimulants are all extremely low, so efficiently purifying these substances is extremely important in analytical chemistry. Aeroponic system can be used for rapid propagation of plants, which is an economical, efficient, ideal experimental system.

At present, scarce knowledge of the types and mechanisms of *O. cumana* germination stimulants, and no corresponding efficient extraction, purification and concentration methods. The method of the disclosure aims to collect *O. cumana* germination stimulants using an aeroponics system and pre-treat the samples of *O. cumana* germination stimulants using SPE, so as to analyze the composition of the germination stimulants of parasitic plants by ultra-high performance liquid chromatography (UHPLC) subsequently, which paves the way for in-depth study of mechanisms of germination stimulants of parasitic plants.

SUMMARY

The disclosure aims to provide a method for efficiently collecting and purifying *O. cumana* germination stimulants using aeroponics and SPE, so as to solve the problem that *O. cumana* germination stimulants extracted and purified in the prior art have only few types and low concentration and purity.

The disclosure adopts the following specific technical solutions:

The disclosure provides a method for efficiently collecting and purifying *O. cumana* germination stimulants using aeroponics and SPE, including the following steps:

(1) making sunflower seeds germinate, then planting resulting sunflower seedlings in an aeroponic device, and cultivating the sunflower seedlings using an aeroponic system;

where, at the aeroponic stage, a phosphorus-containing aeroponic nutrient solution is first used to cultivate the sunflower seedlings for 20 to 25 days, and a phosphorus-free aeroponic nutrient solution is then used instead to subject the sunflower seedlings to starvation cultivation for 5 to 7 days;

(2) passing all nutrient solutions in the aeroponic device through an SPE cartridge for SPE to give *O. cumana* germination stimulants.

The disclosure proposes for the first time to first utilize an aeroponic system to rapidly cultivate sunflower, and utilize SPE to separate and purify *O. cumana* germination stimulants in sunflower root exudates. The obtained *O. cumana* germination stimulants are diversified, and have high concentration and purity. The aeroponic system technology is time-saving and labor-saving, and can reduce the interference of environmental factors, thus making the experimental environment more uniform. Compared with a traditional liquid-liquid extraction method, the SPE technology can increase the recovery rate of an analyte, more effectively separate the analyte from interfering components, avoid the sample-pretreatment process, involve simple operations and less time and labor, and lead to significantly-improved purity and concentration for analytical exudates.

*O. cumana* is the biggest limiting factor in sunflower production in recent years, which significantly reduces the yield and quality of sunflower. It is of great significance for controlling *O. cumana* to deeply study *O. cumana* germination stimulants to induce suicidal germination of *O. cumana* and clarify the germination mechanism.

In the disclosure, after seeds are treated and germinate, an aeroponic system is used to cultivate seedlings, and a modified phosphorus-free Hoagland's nutrient solution is used to subject the seedlings to starvation treatment, which can induce plant roots to secrete more germination stimulants.

In the disclosure, operation steps are rationally designed according to the sprouting and growth process of sunflower seedlings. Specifically, it takes 3 to 4 weeks for sunflower seedlings to grow a large number of mature roots and produce more *O. cumana* germination stimulants, so the time when sunflowers are at the 6-leaf stage is roughly consistent with the time when *O. cumana* begins to germinate and parasitize on the roots of sunflowers in the field. For this reason, in the disclosure, a phosphorus-containing aeroponic nutrient solution is first used to cultivate the sunflower seedlings for 20 to 25 days, and a phosphorus-free aeroponic nutrient solution is then used instead to subject the sunflower seedlings to starvation cultivation.

The germination cultivation consists of a first stage and a second stage. During the first stage, filter paper is wet with sterile water, then sterilized seeds are put on the filter paper placed in a Petri dish, and the Petri dish is wrapped with tin foil and placed at 28° C. for 24 h. During the second stage: black coverings of the seeds are removed, and film-like inner seed coats of the seeds are peeled off; and resulting seeds are put in sterile rock wool, with radicle facing downwards, and the rock wool is wet with a nutrient solution. The inner seed coats are peeled off to make the experimental seedlings uniform and allow the seedlings to grow under consistent conditions, and the experimental variables are controlled to be consistent.

Further, the aeroponic device includes a sprayer, a cultivation bucket and a circulation timing controller;

the sprayer is disposed at the bottom of the cultivation bucket; the cultivation bucket is internally filled with an aeroponic nutrient solution at a liquid level lower than the bottom of root systems of sunflower seedlings; and the top of the cultivation bucket is provided with a bearing cover with planting holes and planting frames located below the planting holes.

Further, a program of the circulation timing controller is set as follows: circularly spraying a solution at an interval of 15 min to 20 min, and spraying for 20 s to 30 s each time.

Further, at the aeroponic stage, the sunflower seedlings are cultivated under the following conditions: cultivation in a greenhouse or an indoor incubator; light-dark cycle: 16 h of light cultivation/8 h of dark cultivation; and daylight and night temperatures: 25° C. and 20° C., respectively.

Further, in step (1), the phosphorus-containing aeroponic nutrient solution is a modified ½ Hoagland's nutrient solution, with a formula: in mass concentration, ammonium nitrate: 430 mg/L to 450 mg/L, dipotassium phosphate: 90 mg/L to 100 mg/L, magnesium sulfate: 180 mg/L to 200 mg/L, potassium sulfate: 130 mg/L to 140 mg/L, ferrous sulfate: 50 mg/L to 60 mg/L, ethylenediaminetetraacetic acid (EDTA) disodium salt dihydrate: 60 mg/L to 70 mg/L, calcium chloride: 220 mg/L to 240 mg/L, and trace elements: boric acid: 1.3 mg/L to 1.5 mg/L, manganese chloride tetrahydrate: 0.80 mg/L to 0.90 mg/L, copper sulfate pentahydrate: 0.070 mg/L to 0.080 mg/L, zinc chloride: 0.10 mg/L to 0.30 mg/L, and sodium molybdate dihydrate: 0.020 mg/L to 0.030 mg/L; and the phosphorus-free aeroponic nutrient solution is a phosphorus-free ½ Hoagland's nutrient solution, with a formula: in mass concentration, ammonium nitrate: 430 mg/L to 450 mg/L, potassium nitrate: 75.0 mg/L to 85.0 mg/L, magnesium sulfate: 180 mg/L to 200 mg/L, potassium sulfate: 130 mg/L to 140 mg/L, ferrous sulfate: 50 mg/L to 60 mg/L, EDTA disodium salt dihydrate: 60 mg/L to 70 mg/L, calcium chloride: 220 mg/L to 240 mg/L, and trace elements: boric acid: 1.3 mg/L to 1.5 mg/L, manganese chloride tetrahydrate: 0.80 mg/L to 0.90 mg/L, copper sulfate pentahydrate: 0.070 mg/L to 0.080 mg/L, zinc chloride: 0.10 mg/L to 0.30 mg/L, and sodium molybdate dihydrate: 0.020 mg/L to 0.030 mg/L.

Further, in step (2), the SPE cartridge is connected to a water pump, and both are immersed in the aeroponic nutrient solution inside the cultivation bucket for SPE.

Further, in step (2), the SPE cartridge is a C18 reversed-phase extraction column.

Further, the SPE includes the following steps:

(a) activating a C18 reverse-phase extraction column with methanol and water sequentially to give an activated C18 reverse-phase extraction column;

(b) connecting the C18 reverse-phase extraction column to a water pump, and immersing the two in the aeroponic nutrient solution in the cultivation bucket together; starting the water pump to pump an aeroponic nutrient solution in the cultivation bucket into the SPE cartridge for collecting *O. cumana* germination stimulants; and loading, rinsing, and eluting with acetone sequentially to give crude *O. cumana* germination stimulants;

(c) activating a silica column with ethyl acetate and n-hexane sequentially to give an activated silica column; and (d) dissolving the crude *O. cumana* germination stimulants obtained in step (b) in a mixture of ethyl acetate and n-hexane with a volume ratio of 1:(80-100); passing a resulting solution through the silica column, and eluting the silica column with n-hexane and a mixture of n-hexane and ethyl acetate with a volume ratio of 1:(8-9) sequentially; and centrifuging and concentrating to give *O. cumana* germination stimulants.

Compared with the prior art, the disclosure has the following beneficial effects.

(1) The disclosure first utilizes an aeroponic system to rapidly cultivate sunflower, and then utilizes SPE to separate and purify *O. cumana* germination stimulants in sunflower root exudates. The obtained *O. cumana* germination stimulants are diversified, and have high concentration and purity.

(2) As the aeroponics technology is fast and efficient, the disclosure optimizes a method for extracting and purifying *O. cumana* germination stimulants from host plant root exudates by establishing an aeroponic system to subject plants to starvation treatment with a phosphorus-free nutrient solution, in combination with SPE. The method reduces the operation time and effort, and can be recycled. The obtained germination stimulants have increased concentration and purity, and can be used for follow-up mass spectrometry (MS) analysis and related research.

BRIEF DESCRIPTION OF DRAWINGS

FIG. 1 shows the comparison of different sunflower varieties in Example 1 in terms of the concentration of dehydrocostus lactone (an *O. cumana* germination stimulants) per plant.

FIG. 2 shows the comparison of different sunflower varieties in Example 1 in terms of the concentration of costunolide (an *O. cumana* germination stimulants) per plant.

FIG. 3 shows the comparison of different sunflower varieties in Example 1 in terms of the peak area of 8-epixanthatin (an *O. cumana* germination stimulants) per plant.

FIG. 4 shows the comparison of different sunflower varieties in Example 1 in terms of the peak area of heliolactone (an *O. cumana* germination stimulants) per plant.

FIG. 5 shows the comparison of different sunflower varieties in Example 1 in terms of the content of dehydrocostus lactone (an *O. cumana* germination stimulants) per unit fresh weight of root.

FIG. 6 shows the comparison of different sunflower varieties in Example 1 in terms of the content of costunolide (an *O. cumana* germination stimulants) per unit fresh weight of root.

FIG. 7 shows the comparison of different sunflower varieties in Example 1 in terms of the peak area of 8-epixanthatin (an *O. cumana* germination stimulants) per unit fresh weight of root.

FIG. 8 shows the comparison of different sunflower varieties in Example 1 in terms of the peak area of heliolactone (an *O. cumana* germination stimulants) per unit fresh weight of root.

FIG. 9A shows an 8-hole planting cover of a plastic cultivation bucket of the plant cultivation system;

FIG. 9B shows a planting basket with a hollow bottom, which is filled with rock wool inside, and the root system of sunflower extends from the bottom of the planting basket; and FIG. 9C shows the soilless plant cultivation system of the present disclosure.

FIG. 10 is a physical picture of the SPE device in Example 1.

FIG. 11 is a flow diagram for the method of the disclosure in Example 1.

FIG. 12 shows the comparison of different sunflower varieties in terms of the concentration of dehydrocostus lactone (an *O. cumana* germination stimulants) per plant under a conventional hydroponic system in Comparative Example 1.

FIG. 13 shows the comparison of different sunflower varieties in terms of the concentration of costunolide (an *O. cumana* germination stimulants) per plant under a conventional hydroponic system in Comparative Example 1.

FIG. 14 shows the comparison of different sunflower varieties in terms of the peak area of 8-epixanthatin (an *O. cumana* germination stimulants) per plant under a conventional hydroponic system in Comparative Example 1.

FIG. 15 shows the comparison of different sunflower varieties in terms of the peak area of heliolactone (an *O. cumana* germination stimulants) per plant under a conventional hydroponic system in Comparative Example 1.

FIG. 16 shows the comparison of different sunflower varieties in terms of the content of dehydrocostus lactone (an *O. cumana* germination stimulants) per unit fresh weight of root under a conventional hydroponic system in Comparative Example 1.

FIG. 17 shows the comparison of different sunflower varieties in terms of the content of costunolide (an *O. cumana* germination stimulants) per unit fresh weight of root under a conventional hydroponic system in Comparative Example 1.

FIG. 18 shows the comparison of different sunflower varieties in terms of the peak area of 8-epixanthatin (an *O. cumana* germination stimulants) per unit fresh weight of root under a conventional hydroponic system in Comparative Example 1.

FIG. 19 shows the comparison of different sunflower varieties in terms of the peak area of heliolactone (an *O. cumana* germination stimulants) per unit fresh weight of root under a conventional hydroponic system in Comparative Example 1.

DETAILED DESCRIPTION

The disclosure is further described below in conjunction with specific examples. The examples listed below are only specific examples of the disclosure, and the protection scope of the disclosure is not limited thereto.

Example 1

□. Experimental Method (1) Preparation and Treatment of Seeds

The required amount of seeds was calculated based on the germination rate of the seeds (a germination rate test was conducted in advance). In this experiment, 4 sunflower varieties (genotype) were selected, each with 24 replicates, and a total of 96 plants were needed. About 100 sunflower seeds were prepared in advance for each variety.

(2) Preparation of Nutrient Solutions

A modified ½ Hoagland's nutrient solution (half strength Hoagland's solution) was adopted as sunflower nutrient solution. The formula of the modified ½ Hoagland's nutrient solution was shown in the following table, and the solution had final pH of 5.8. The volume of the nutrient solution was determined according to specific experimental conditions. In this experiment, a concentrated nutrient solution was first prepared and bottled for later use, which would be diluted subsequently for use. For example, plastic bucket with volume of 25 L could be used.

TABLE 1

Formula of concentrated stock solution of the modified 1/2 Hoagland's nutrient solution (half strength Hoagland's solution)

| Solutes | Phosphorus-containing, 1000X g/100 mL | Phosphorus-free, 1000X g/100 mL |
|---|---|---|
| Ammonium nitrate, $NH_4NO_3$ | 44.8 | 44.8 |
| Potassium nitrate, $KNO_3$ | / | 8.08 |
| Dipotassium phosphate, $K_2HPO_4$ | 9.85 | / |
| Magnesium Sulfate, $MgSO_4$ | 19.7 | 19.7 |
| Potassium sulfate, $K_2SO_4$ | 13.94 | 13.94 |
| Ferrous sulfate, $FeSO_4$ | 5.75 | 5.75 |
| EDTA disodium salt dihydrate (EDTA-$Na_2$) | 6.6 | 6.6 |
| calcium chloride, $CaCl_2$ | 23.5 | 23.5 |
| Trace elements, 1000X | / | / |

TABLE 2

Composition of trace elements in the modified 1/2 Hoagland's nutrient solution (half strength Hoagland's solution)

| Solutes | 1000X inorganic salt mass concentration, g/L |
|---|---|
| Boric acid, $H_3BO_3$ | 1.42 |
| Manganese chloride tetrahydrate, $MnCl_2 \cdot 4H_2O$ | 0.89 |
| Copper sulfate pentahydrate, $CuSO_4 \cdot 5H_2O$ | 0.078 |
| Zinc chloride, $ZnCl_2$ | 0.20 |
| Sodium molybdate dihydrate, $Na_2MoO_4 \cdot 2H_2O$ | 0.024 |

(3) Germination of Seeds

Disinfection of seeds: The seeds were first treated with 1% chlorine bleach for 5 min, and rinsed 5 times with sterile distilled water. Commonly-used disinfectant solutions could be freely chosen according to different plants. The disinfection of seeds is a very important step, which will affect subsequent experiments, so the disinfection time can be appropriately extended.

Germination of seeds: A layer of glass-fiber filter paper was put in a Petri dish with a diameter of 100 mm and wet with sterile water. The seeds were evenly spread on the wet filter paper, and the dish was sealed with Parafilm® sealing film (Parafilm, USA) to prevent water from losing, and wrapped with tin foil outside to establish a completely dark environment. The dish was placed at 28° C. for 24 h, namely, one day (the time was determined depending on the germination conditions of different plant varieties).

Sprouting of seeds: The outer seed coats of the seeds were first peeled off, and the film-like inner seed coats of the seeds were then carefully peeled off with fingers or tweezers. The above operation was conducted to make resulting experimental seedlings uniform and allow the seedlings to grow under consistent conditions. Otherwise, the growth rates of seedlings are likely to be very different from each other, which will affect the results of the experiment. The seeds were carefully put into block-shaped sterile rock wool, with radicle facing downwards, and the rock wool was irrigated with the modified ½ Hoagland's nutrient solution. Cultivation was conducted in a greenhouse or an indoor incubator under the following conditions: light-dark cycle: 16 h/8 h; and daylight and night temperatures: 25° C./20° C., and the cultivation was conducted for 2 to 3 days until sunflower radicles appeared.

(4) Construction of an Aeroponic System

A plant aeroponic system included: a spray system, a cultivation system, a circulation controller, and a nutrient solution. Related products can be purchased from a shopping platform such as Taobao.

The spray system consisted of a high-pressure spray pump, a spray circulating water pipe, a spray support frame, a spray head, and the like. The cultivation system consisted of a plastic cultivation pot, a bearing cover with 8 planting holes, an aeroponic planting cup/planting basket, and the like. The circulation controller was used for circularly spraying the nutrient solution at regular intervals. The nutrient solution varies according to different plants.

This experiment adopted a plastic cultivation bucket with a volume of 20 L, a diameter of 30 cm, and a height of 39 cm. 8 planting holes were disposed on the 8-hole bearing cover, and a large hole in the middle was used to allow the wire connecting a power supply device to pass.

The aeroponic planting cup/planting basket had dense meshes, facilitating the rooting of hydroponic plants, and the planting cup/planting basket had a depth sufficient for fixing the plants.

The dedicated black plastic bucket of the cultivation system was washed with tap water, ethanol, and demi water sequentially, and dried for later use.

For the preparation of the plastic black hollow planting basket/cup, it should be noted that the bottom of the planting basket must be empty. Scissors can be used to cut the bottom manually, so that the root system of a plant can well stretch. Sterile rock wool was prepared and sterilized in advance by autoclave sterilization. The size of the rock wool was tailored according to the size of the planting basket, or rock wool with the corresponding size could be purchased. The rock wool was put into the planting basket with a hollow bottom. A black fabric was prepared and cut into a hollow shape, with a size slightly smaller than the rock wool size. Preparation of labels: Each bucket had a corresponding number. For example, the 12 buckets in this experiment were labeled with 1, 2, 3 . . . , and 12, respectively.

(5) Transplantation of Seedlings

Seedlings of each sunflower variety were transplanted into three buckets, each bucket with 8 replicates, namely, 8 seedlings. A total of 4 varieties were randomly transplanted into 12 pots.

Seedlings of each variety were spatially dispersed randomly in that the light inside the greenhouse may be nonuniform and other factors may affect the experimental results. In order to obtain more scientific and reasonable data and prevent specific results from appearing, it is more reasonable to spatially distribute the pots (namely, varieties) randomly. The temperature of the greenhouse was set to 22° C. (the set temperature varies according to cultivated plants). Each seedling was transplanted into a planting basket filled with rock wool, and finally the rock wool was covered with a hollow black fabric to prevent the growth of algae or the like. Each bucket was labeled with the number of a corresponding sunflower variety.

(6) Setting for the Aeroponic System 12 black Soviet buckets with lids were prepared, and each bucket was poured with 2 L of a plant nutrient solution, equipped with a sprayer, and connected to a brushless DC pump (BRUSHLESS DC PUMP, 12V, 4.2 W). A circulation timing controller was adjusted. 4 timing controllers were used in this experiment. A spray time of 30 s was set for a first controller, a spray time of 20 s was set for a second timer, a spray time of 20 s was set for a third timer, and a spray time of 20 s was set for a fourth timer. A spray interval of 5 s was set for each timing controller, and a large cycle delay time was set to be 15 min.

Daily management: It was checked whether the sprayer is running well half an hour after the system was started. Little management was required during cultivation. The nutrient solution in the cultivation bucket was checked every few days to ensure the normal operation of the aeroponic system. The growth of plants was observed and recorded every day, and the time to collect *O. cumana* germination stimulants was determined based on the growth of sunflowers.

(7) The modified Hoagland's nutrient solution was regularly replaced.

(8) In this experiment, root exudates were collected 28 days after the transplantation. After the collection, an electronic balance was used to record the fresh weight of the root systems of plants in each bucket.

(9) After 21 days of cultivation, a phosphorus-free ½ modified Hoagland's nutrient solution was used instead to conduct starvation treatment for one week. A formula of the nutrient solution can be seen in Table 1 and Table 2.

After 26 days of cultivation, *O. cumana* germination stimulants were collected using SPE, and related operations were conducted in a fume hood.

1) Activation of extraction cartridges: SPE cartridges (Supelco Discovery® DSC-18 extraction cartridge (6 mL)) were put into a solid-phase vacuum extraction device (SUPELCO Visiprep 24™ DL), and the vacuum extraction device was turned on; 6 mL of methanol was poured into each extraction cartridge; after the methanol in the cartridge was evacuated, 6 mL of ultrapure water (MillQ) was poured; and after the ultrapure water in the cartridge was evacuated, all extraction cartridges were pushed into a large bucket filled with sterile distilled water, ensuring that all SPE cartridges were immersed in the water. The cartridge was wet and activated with methanol to allow an analyte to be in close contact with the surface of the solid phase, facilitating adsorption, and to remove impurities in the cartridge, reducing contamination. Distilled water was adopted because the pH of the root exudate solution was close to that of water, making that a sample solution well contacted with the surface of an adsorbent and the extraction efficiency was improved.

2) Collection of samples: A brushless DC pump and a power supply device were prepared. An SPE cartridge filled with water was selected, and the mouth of the cartridge was blocked with a thumb to ensure that no air would enter the cartridge. The extraction column was connected to the brushless DC pump, and put in a bucket. When water started to bubble from the extraction cartridge, the device was working well. 12 cartridges were sequentially put into the bucket. 48 later, a bottle filled with ultrapure water was prepared. The power supply device was turned off, and SPE cartridges in each bucket were carefully taken out and immediately put into the bottle filled with water.

3) Loading of samples and rinsing: An SPE cartridge loaded with a sample was put into the solid-phase vacuum extraction device, and the power supply was turned on. After the root exudate solution in the cartridge was evacuated, and the cartridge was rinsed with ultrapure water (MillQ) three times.

4) Elution: Elution was conducted with 2 mL of acetone, and an eluate was received in a vial. Then the vial was replaced with a new vial, elution was conducted again with 2 mL of acetone, and an eluate was received in the new vial. Two vials of sample were collected for the root exudate solution of each bucket. As there were 12 buckets in total, a total of 24 vials of sample were collected in this experiment. The vials can be stored in a refrigerator at −20° C.

(10) Purification of Samples 1) 2 mL of each of the samples stored in the refrigerator at −20° C. after the above steps was taken out.

2) 200 μl of an internal standard (D6-epi-5DS@ 0.1 n mol/mL) was added to each vial, and a resulting mixture was dried in a vacuum centrifugal concentrator until water was completely removed and the sample was completely dried.

3) 37.5 μl of ethyl acetate and 3 mL of n-hexane were added to each dried sample for dissolving the sample. A silica column (200 mg/3 mL) was activated as follows: 2 mL of ethyl acetate was added; after all the ethyl acetate flowed out from the column, 4 mL of n-hexane was added; and after all the n-hexane flowed out, the column was successfully activated.

4) The two 2 mL samples (namely, 4 mL) collected from the same variety were together put into the activated silica cartridge, and separation was completed when the 4 mL of sample solution all flowed out from the cartridge.

5) Rinsing: 2 mL of 100% n-hexane was added, and rinsing was completed when the n-hexane all flowed out.

6) Collection: 2 mL of a mixture of n-hexane and ethyl acetate (10:90) was added for LC/MS analysis, and a resulting mixture was dried in a vacuum centrifugal concentrator. 200 μl of 25% acetonitrile was added, and a resulting mixture was filtered in an LC/MS analysis-specific vial using a Sartorius Minisart® syringe filter.

7) The ultra-high performance liquid chromatograph-triple quadrupole mass spectrometry (UHPLC-TQ-MS) was adopted to separate and detect the components of obtained *O. cumana* germination stimulants.

The *O. cumana* germination stimulants in sunflower root exudates were identified using ultra-high performance liquid chromatography-mass spectrometry (UHPLC-MS/MS), and analyzed using Micromass Quattro Premier XE tandem mass spectrometer (Waters, USA). The mass spectrometer was equipped with an electrospray ionization source (ESI) and combined with a UHPLC system. Chromatographic conditions: UHPLC C18 column (100 mm×2.1 mm, 1.7 μm), and mobile phase: water-methanol.

Gradient elution process: 30% methanol for 1 min; 5 min of transition to 80% methanol, and holding at 80% methanol for 1 min; and 0.2 min of transition back to 30% methanol. The column was equilibrated in this solvent composition for 1.8 min before proceeding to the next run. Each run: 9 min; column temperature: 50° C.; flow rate: 0.4 mL/min; and injection volume: 30 μl.

MS conditions: ESI, in positive ion scanning mode; gas flow rates of atomizer and desolventizing: 50|h$^{-1}$ and 800|h$^{-1}$, respectively; capillary voltage: 2.7 kV; extraction cone voltage: 20 V, source temperature: 120° C.; and desolventizing gas temperature: 450° C. 3.0×10$^{-3}$ mbar argon was used for collision to induce dissociation and fragmentation. The collision energy for each compound was optimized. Multiple response monitoring (MRM) scanning mode was adopted to search for *O. cumana* germination stimulants. Mass-to-charge ratio scan range data can be found in (Raupp & Spring 2013; Ueno et al. 2014).

Masslynx 4.1 software (Waters) was used for data collection and analysis. Genstat generalized linear model (GLM), generalized linear mixed model (GLMM), or analysis of variance (anova) was used to analyze the data.

II. Experimental Results

Figure 1:
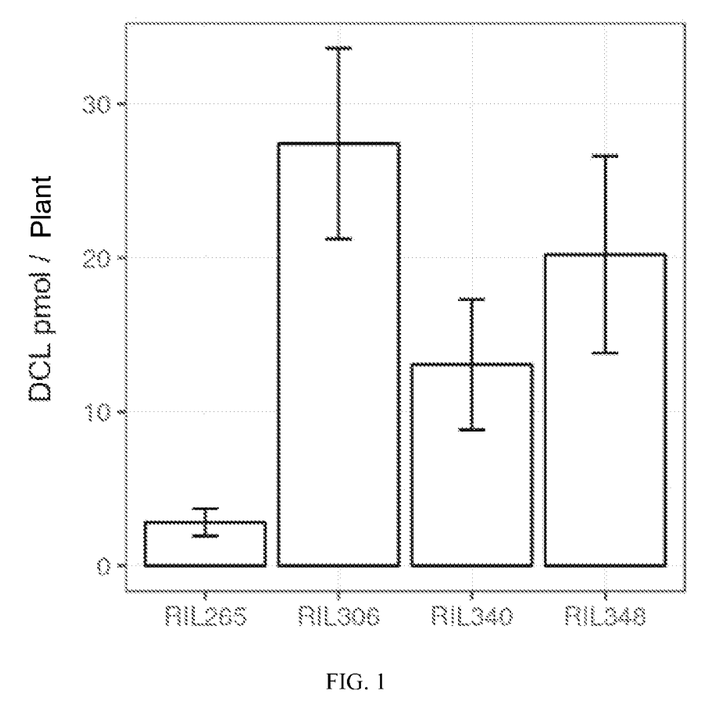
Figure 5:
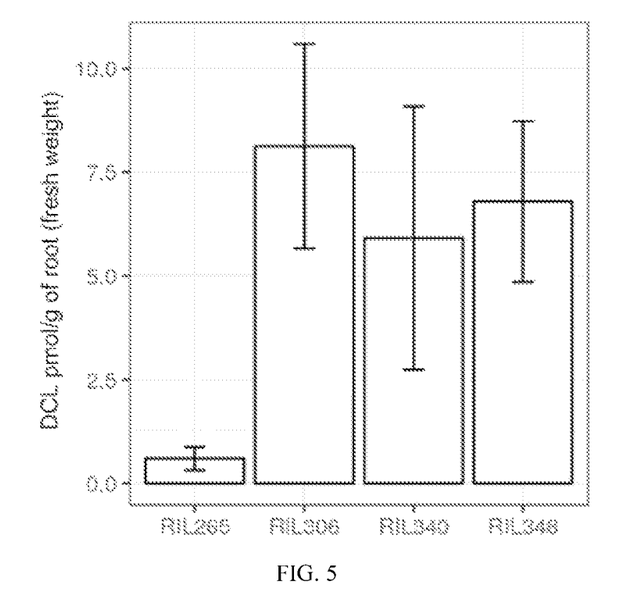

FIG. 1 shows the comparison of different sunflower varieties in terms of the concentration of dehydrocostus lactone (an *O. cumana* germination stimulants) per plant. The average concentration of dehydrocostus lactone secreted per plant for the sunflower varieties RIL306, RIL340 and RIL348 is 10 picomoles to 30 picomoles, and the average concentration of dehydrocostus lactone secreted per plant for the sunflower variety RIL265 is less than 5 picomoles. FIG. 5 shows the comparison of different sunflower varieties in terms of the average content of dehydrocostus lactone (an *O. cumana* germination stimulants) per unit fresh weight of root. The average content of dehydrocostus lactone per unit fresh weight (g) of root for the sunflower varieties RIL306, RIL340 and RIL348 is 5 picomoles to 10 picomoles, and the average concentration of dehydrocostus lactone per plant for the sunflower variety RIL265 is less than 1 picomole. Results show that, in terms of dehydrocostus lactone per sunflower plant and dehydrocostus lactone per unit fresh weight of root, the results were similar and comparable. It shows that the root systems of all plants have almost the same fresh weight, and all grow well, which further proves that the experiment under an aeroponic system is controllable and repeatable.

Figure 2:
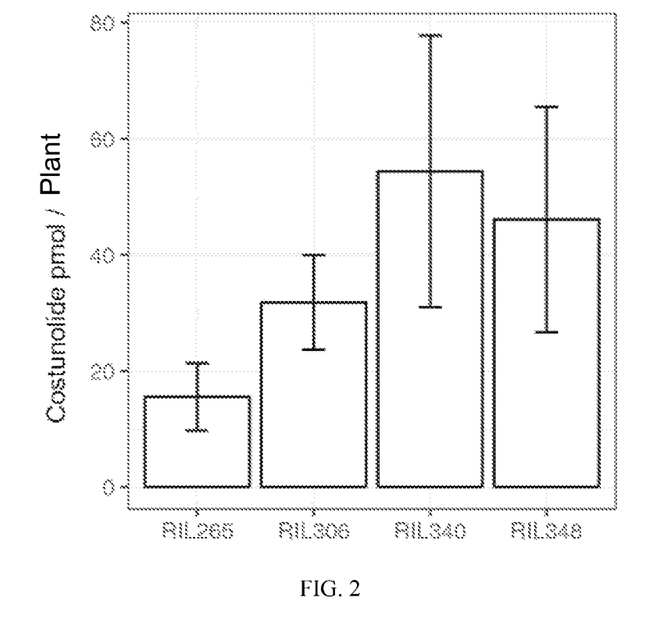
Figure 6:
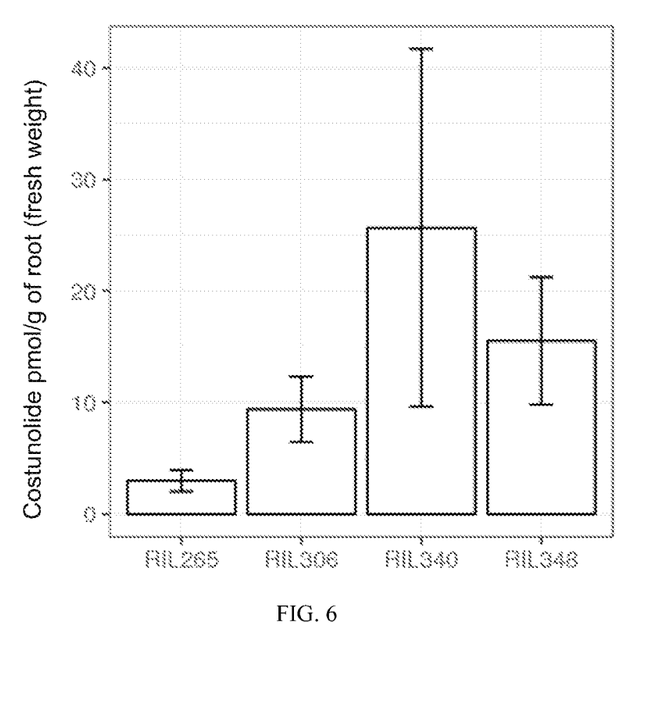

FIG. 2 shows the comparison of different sunflower varieties in terms of the concentration of costunolide (an *O. cumana* germination stimulants) per plant. The average concentration of costunolide per plant for the sunflower varieties RIL306, RIL340 and RIL348 is 20 picomoles to 60 picomoles, and the average concentration of costunolide per plant for the sunflower variety RIL265 is less than 20 picomoles. FIG. 6 shows the comparison of different sunflower varieties in terms of the content of costunolide (an *O. cumana* germination stimulants) per unit fresh weight of root. The average content of costunolide per unit fresh weight (g) of root for the sunflower varieties RIL306, RIL340 and RIL348 is 10 picomoles to 30 picomoles, and the average content of dehydrocostus lactone per plant for the sunflower variety RIL265 is less than 5 picomoles.

Figure 3:
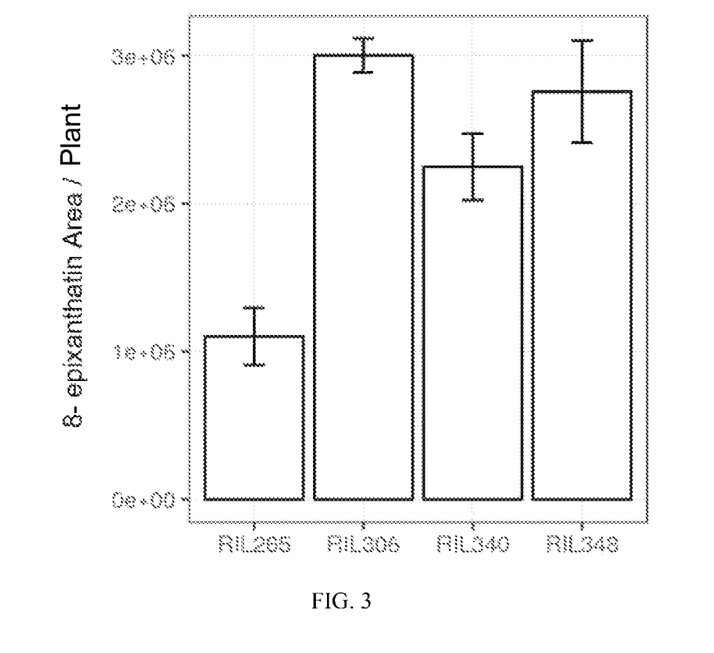
Figure 7:
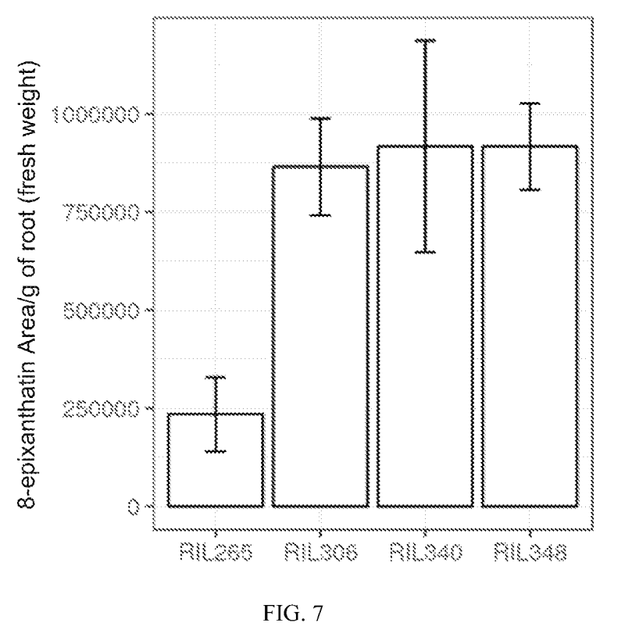

FIG. 3 shows the comparison of different sunflower varieties in terms of the UPLC peak area of 8-epixanthatin (an *O. cumana* germination stimulants) per plant. The average peak area of 8-epixanthatin per plant for the sunflower varieties RIL306, RIL340, and RIL348 is 2e-3e*10^6, and the average peak area of dehydrocostus lactone per plant for the sunflower variety RIL265 is about 1e*10^6. FIG. 7 shows the comparison of different sunflower varieties in terms of the content of 8-epixanthatin (an *O. cumana* germination stimulants) per unit fresh weight of root. The average peak area of 8-epixanthatin per unit fresh weight of root for the sunflower varieties RIL306, RIL340, and RIL348 is 7e-10e*10^6, and the average peak area of dehydrocostus lactone per plant for the sunflower variety RIL265 is about 2.5e*10^6.

Figure 4:
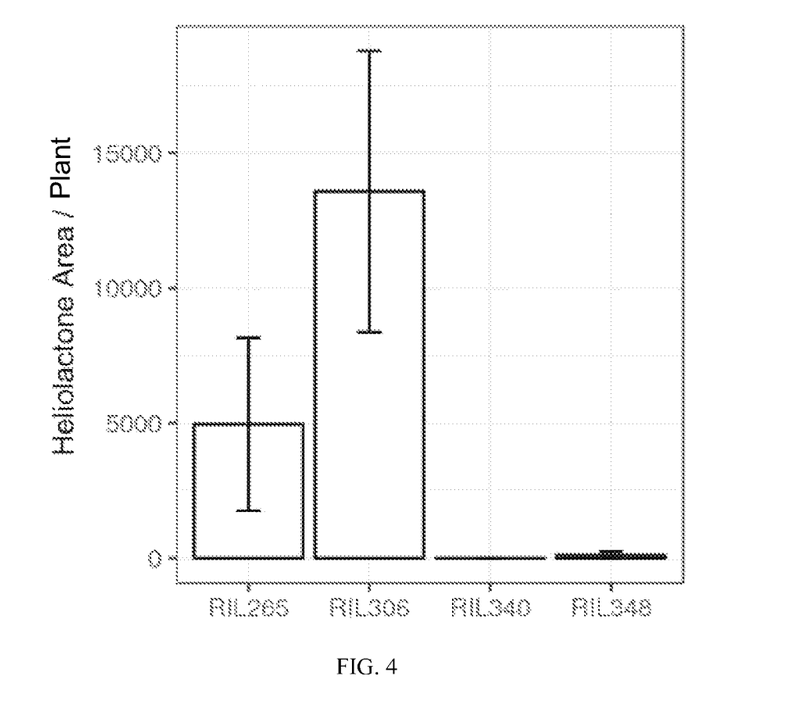
Figure 8:
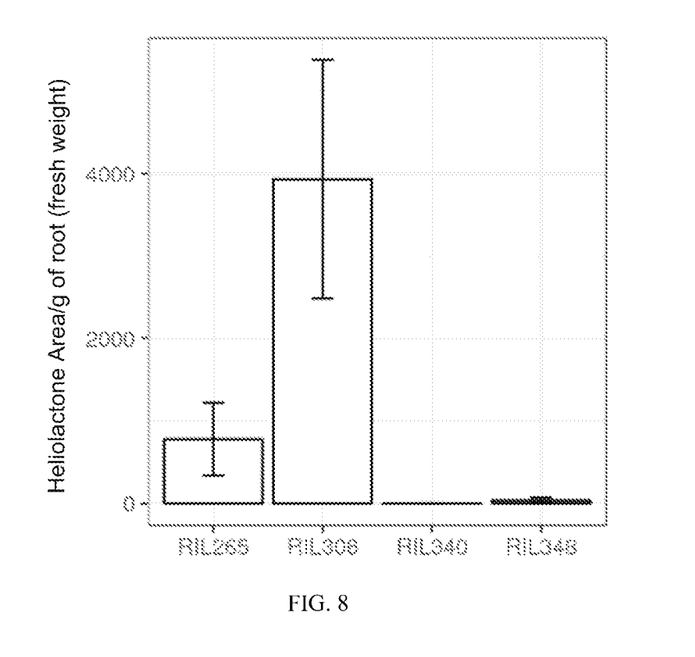
Figure 9:
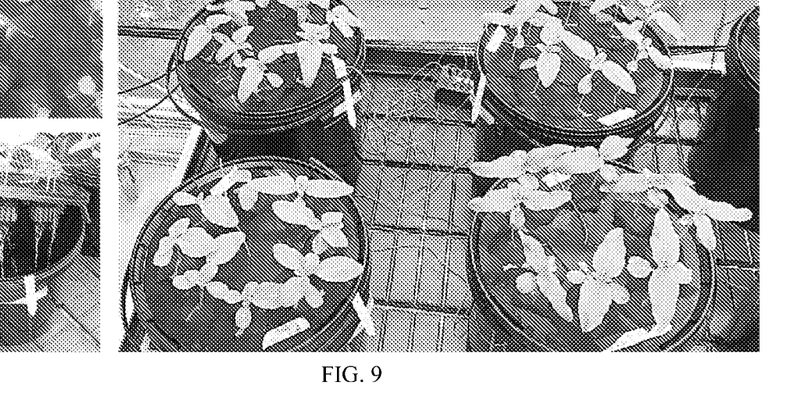
Figure 10:
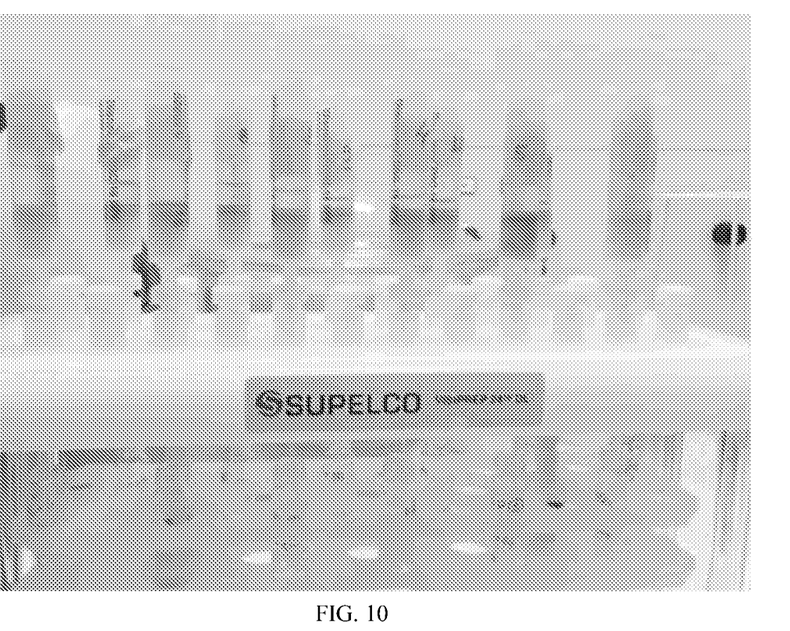
Figure 11:
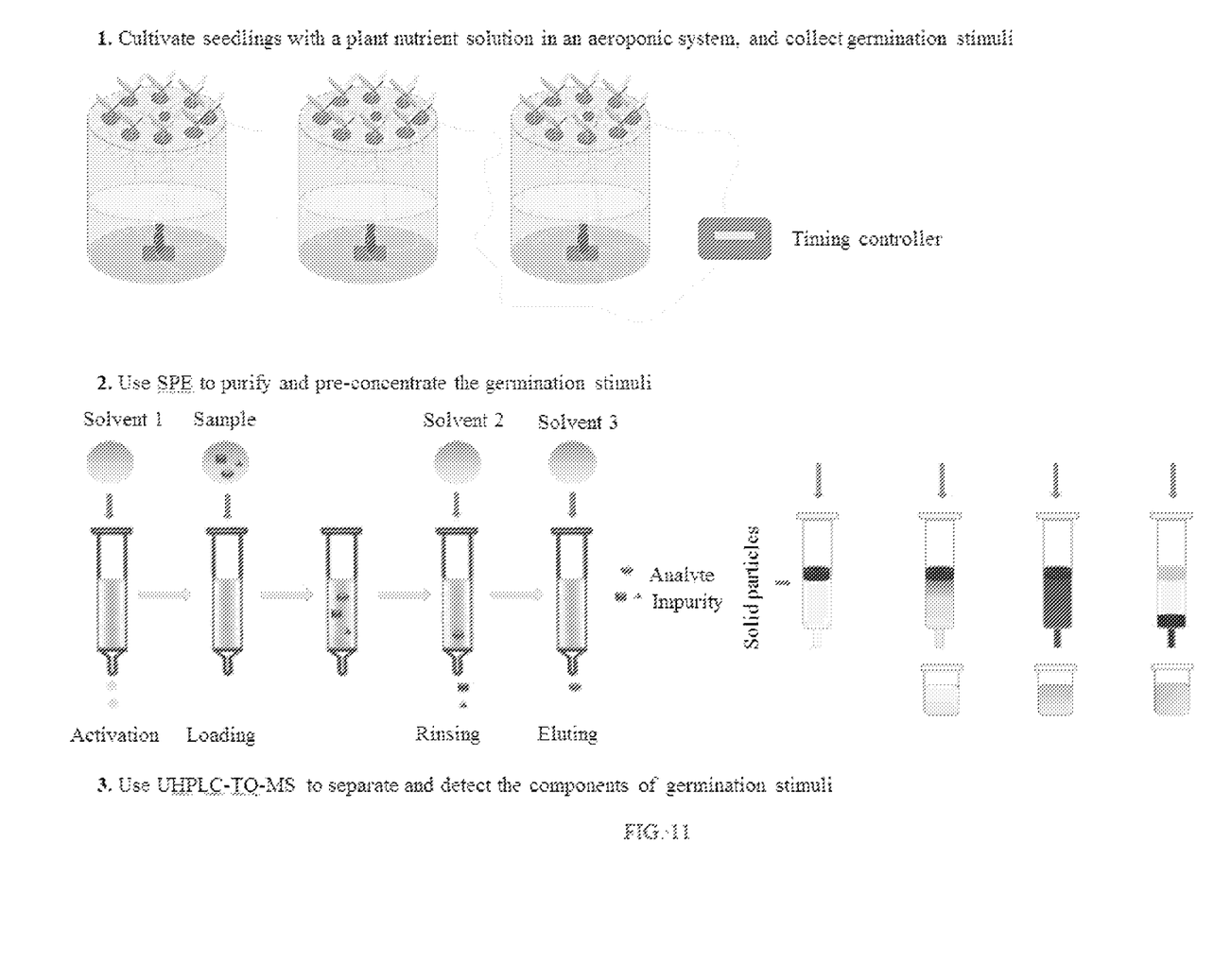
Figure 12:
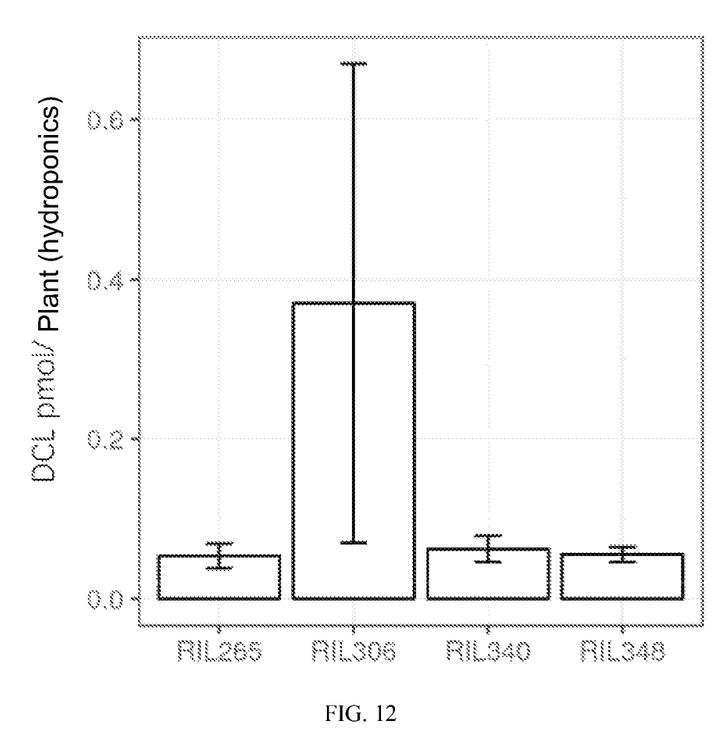
Figure 13:
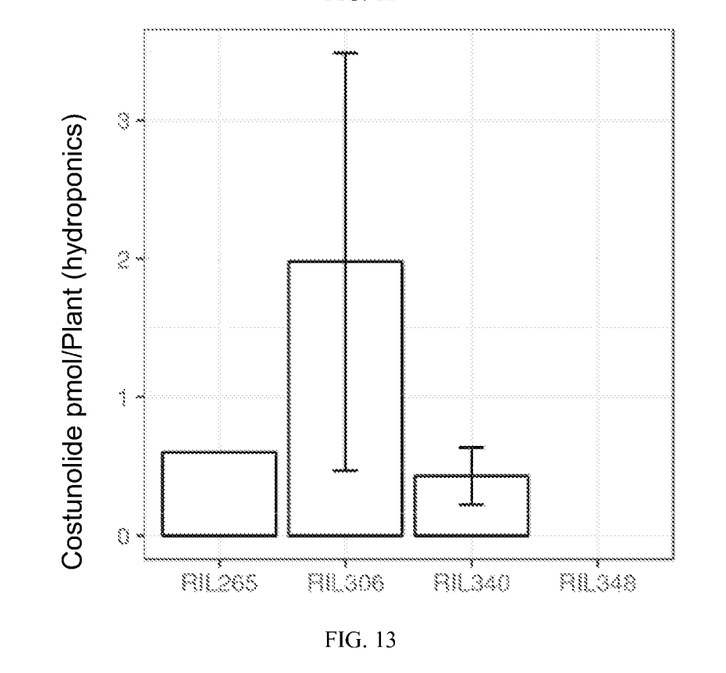
Figure 14:
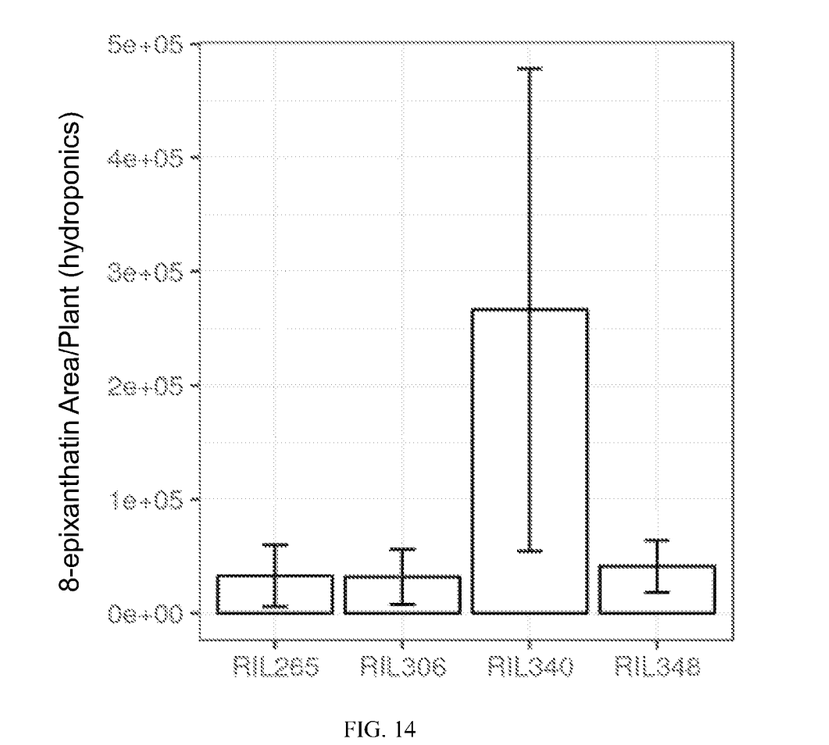
Figure 15:
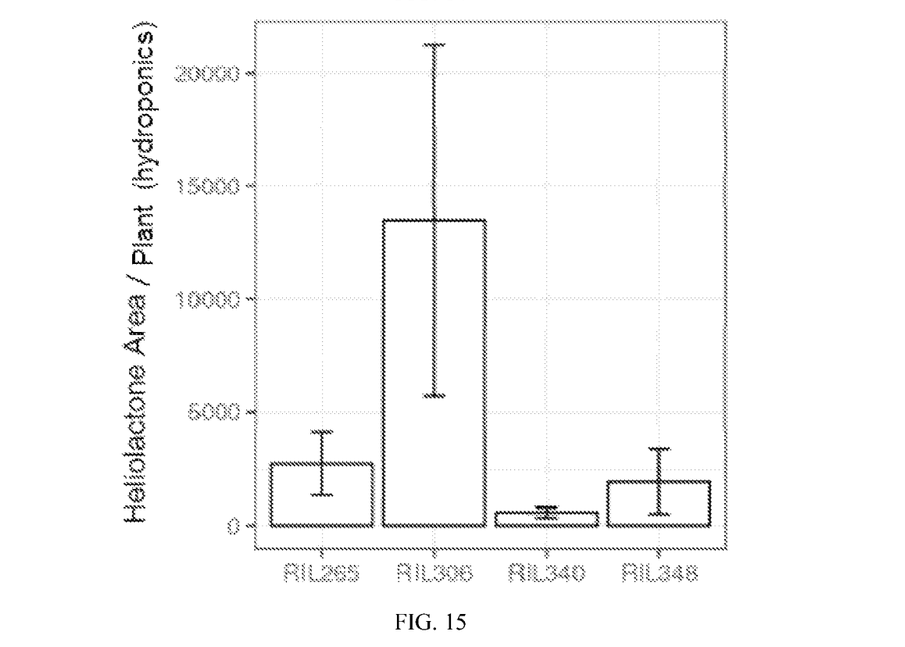
Figure 16:
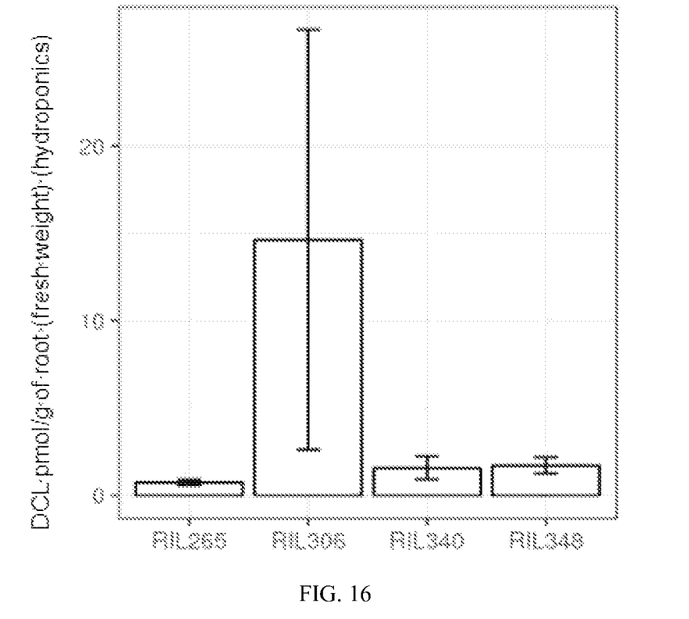
Figure 17:
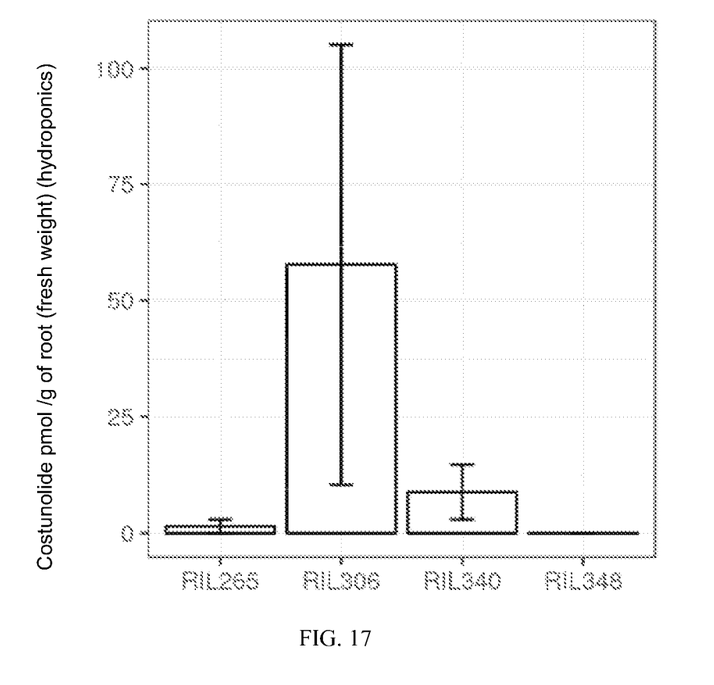
Figure 18:
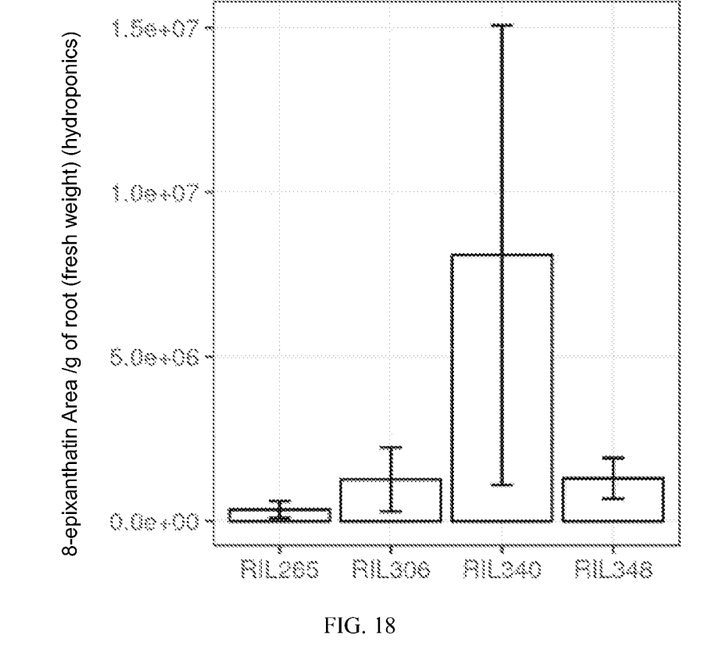
Figure 19:
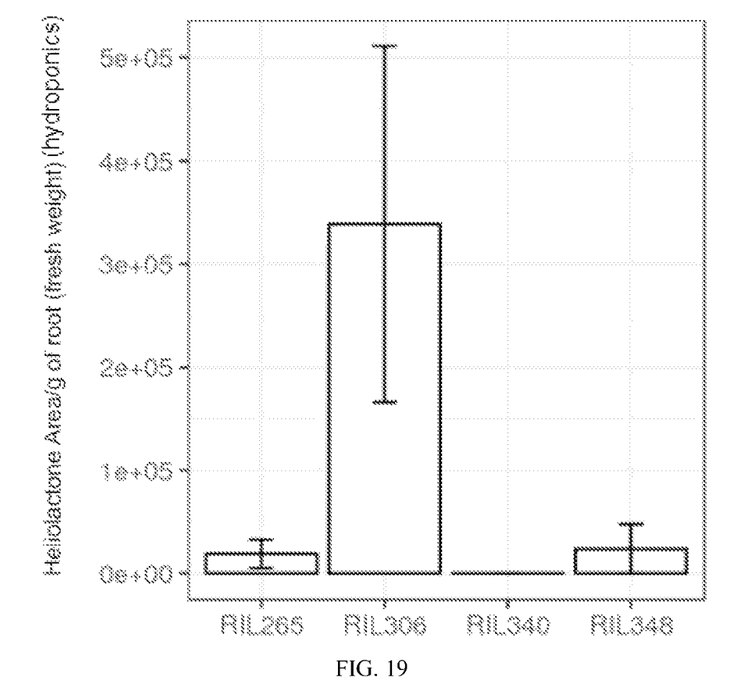

FIG. 4 shows the comparison of different sunflower varieties in terms of the UPLC peak area of heliolactone (an *O. cumana* germination stimulants) per plant. The average peak area of heliolactone (an *O. cumana* germination stimulants) per plant for the sunflower variety RIL306 is about 12,000, but heliolactone is not detected in RIL340 and RIL348. The average peak area of heliolactone per plant for the sunflower variety RIL265 is about 5,000. FIG. 8 shows the comparison of different sunflower varieties in terms of the concentration of heliolactone (an *O. cumana* germination stimulants) per unit fresh weight of root. The average peak area of heliolactone (an *O. cumana* germination stimulants) per unit fresh weight of root for the sunflower variety RIL306 is about 4,000, but heliolactone is not detected in RIL340 and RIL348. The average peak area of heliolactone per plant for the sunflower variety RIL265 is about 1000. It can be seen that heliolactone has an extremely-low content or even is undetectable in the *O. cumana* germination stimulants of all sunflower varieties, and thus cannot be quantified. Moreover, the peak area of heliolactone has a much-smaller size than 8-epixanthatin.

Results show that, compared with the sunflower variety RIL265, the sunflower varieties RIL306, RIL340, RIL348 provide *O. cumana* germination stimulants with relatively-more dehydrocostus lactone, costunolide, and 8-epixanthatin. However, heliolactone is only detected in RIL265 and RIL306, with an extremely-low content.

III. Analysis of Results

In this experiment, sunflower varieties RIL306, RIL340, RIL348, and RIL265 were adopted. In the early *O. cumana* germination rate test (which will not detailed here), sunflower varieties RIL340 and RIL306 exhibited relatively-high *O. cumana* germination rates, while sunflower varieties RIL265 and RIL348 exhibited low *O. cumana* germination rates.

Under the aeroponic system, sunflower seedlings grew vigorously, whose root systems grew well and healthy. Two weeks later, the root systems began to stretch rapidly. Four weeks later, almost all plants entered the 6-leaf stage. After the samples of *O. cumana* germination stimulants were collected and pre-treated, the UHPLC-TQ-MS was adopted to separate and detect the components in obtained *O. cumana* germination stimulants samples.

In this experiment, based on previous literature data, four types of *O. cumana* germination stimulants were selected for detection. Three are biologically-active sesquiterpenes isolated from *O. cumana* germination stimulants, namely, dehydrocostus lactone, costunolide, and 8-epixanthatin, and the remaining one is a non-sesquiterpene, namely, heliolactone.

Results show that, under the aeroponic system, the biological activities of the above four *O. cumana* germination stimulants are detected in the collected *O. cumana* germination stimulants, where, dehydrocostus lactone, costunolide, and 8-epixanthatin have high activities, while the non-sesquiterpene heliolactone has a very low activity. *O. cumana* germination stimulants from different sunflower varieties exhibit different active concentrations.

In terms of germination stimulants per sunflower plant and germination stimulants per unit fresh weight of root, the results are similar and comparable. It shows that the root systems of all plants have almost the same fresh weight, and all grow well, which further proves that the experiment under an aeroponic system is controllable and repeatable.

As the aeroponics technology is fast and efficient, the disclosure optimizes a method for extracting and purifying *O. cumana* germination stimulants from host plant sunflower root exudates by establishing an aeroponic system to subject plants to starvation treatment with a phosphorus-free nutrient solution, in combination with SPE. The method is time-saving and effort-saving, and can be recycled. The obtained germination stimulants have increased concentration and purity, and can be used for follow-up MS analysis and related research.

Comparative Example 1

This comparative example adopted a conventional hydroponic method, and the hydroponic experiment was conducted in an indoor climate incubator.

Specific steps were as follows:

(1) A piece of glass fiber filter paper was put at the bottom of a Petri dish, sunflower seeds were evenly spread on the filter paper, and the seeds were covered with a piece of filter paper. A disinfectant (Metalaxyl) was poured, and the seeds were soaked for 3 h to 4 h. The seeds were then orderly arranged on a germination paper wet with the disinfectant (Metalaxyl) or distilled water, and the paper was carefully rolled up. The rolled germination paper was vertically put into a 5 L bucket container. The container was wrapped with a film to prevent moisture from losing, and placed in an incubator at 28° C. for 48 h, or at 25° C. for 72 h.

(2) Preparation of a hydroponic system: 25 L hydroponic box, plant nutrient solution (low-phosphorus ½ Long Ashton nutrient solution), artificially-perforated waterproof foam plastic board, and circulating water pump. Cultivation was conducted in a greenhouse at 22° C., with a light-dark cycle of 16 h/8 h and a humidity of 70%. The film-like inner seed coats of the seeds were peeled off, and the healthy germinated seeds were carefully put into the small holes of the foam plastic board, making the radicle contact with the nutrient solution. The seedlings were cultivated for 14 or 21 days.

(3) The roots of the plants were rinsed with ultrapure water and put into 50 mL test tubes, and 30 mL of ultrapure water was poured. The volume of the water was adjusted according to the size of the root system of a plant. The test tube was wrapped with aluminum foil so that the root grew in the dark for 24 h. The volume of each sample was measured, and a plant root exudate solution was filtered with a 0.22 µm pinhole filter.

(4) The sunflower roots were cut, dried, and weighed. Each sample was adjusted so that 1 mL of a root exudate solution corresponded to 1 g (dry weight) of plant root. The method to extract and purify germination stimulants from root exudates was the same as that in the aeroponic method. The UHPLC-TQ-MS was adopted to separate and detect the components of obtained *O. cumana* germination stimulants.

In this experiment, sunflower varieties RIL306, RIL340, RIL348, and RIL265 were adopted. In the early *O. cumana* germination rate test (which will not detailed here), sunflower varieties RIL340 and RIL306 exhibited relatively-high *O. cumana* germination rates, while sunflower varieties RIL265 and RIL348 exhibited low *O. cumana* germination rates. After the samples of *O. cumana* germination stimulants were collected and pre-treated, the UHPLC-TQ-MS was adopted to separate and detect the components in obtained *O. cumana* germination stimulants samples.

The results are shown in FIG. 12 to FIG. 19. Under the hydroponic system, the concentration of *O. cumana* germination stimulants was many times lower than that under the aeroponic system. Through the comparison in the same variety, it was found that no germination stimulants was detected in some varieties under the hydroponic system, for example, no costunolide was detected in the root exudates of the sunflower variety RIL348. Results show that *O. cumana* germination stimulants obtained under the aeroponic system have a higher purity and concentration than that obtained under a conventional hydroponic system.

What is claimed is:

1. A method for efficiently collecting and purifying *Orobanche cumana* (*O. cumana*) germination stimulants using aeroponics and solid-phase extraction (SPE), comprising the following steps:
   (1) germinating sunflower seeds, then planting resulting sunflower seedlings in an aeroponic device, and cultivating the sunflower seedlings using an aeroponic system;
   wherein, at aeroponic stage, a phosphorus-containing aeroponic nutrient solution is first used to cultivate the sunflower seedlings for 20 to 25 days, and a phosphorus-free aeroponic nutrient solution is then used to subject the sunflower seedlings to starvation cultivation for 5 to 7 days;
   (2) passing nutrient solutions in the aeroponic device through an SPE cartridge for SPE to give *O. cumana* germination stimulants.

2. The method for efficiently collecting and purifying *O. cumana* germination stimulants using aeroponics and SPE according to claim 1, wherein, the aeroponic device comprises a sprayer, a cultivation bucket and a circulation timing controller;
   the sprayer is disposed at the bottom of the cultivation bucket; the cultivation bucket is internally filled with an aeroponic nutrient solution at a liquid level lower than the bottom of root systems of sunflower seedlings; and the top of the cultivation bucket is provided with a bearing cover with planting holes and planting frames located below the planting holes.

3. The method for efficiently collecting and purifying *O. cumana* germination stimulants using aeroponics and SPE according to claim 2, wherein, a program of the circulation timing controller is set as follows: circularly spraying a solution at an interval of 15 minutes (min) to 20 min, and spraying for 20 seconds (s) to 30 s each time.

4. The method for efficiently collecting and purifying *O. cumana* germination stimulants using aeroponics and SPE according to claim 2, wherein, at the aeroponic stage, the sunflower seedlings are cultivated under the following conditions: cultivation in a greenhouse or an indoor incubator; light-dark cycle: 16 hours (h) of light cultivation/8 h of dark cultivation; and daylight and night temperatures: 25° C. and 20° C., respectively.

5. The method for efficiently collecting and purifying *O. cumana* germination stimulants using aeroponics and SPE according to claim 2, wherein, in step (1), the phosphorus-containing aeroponic nutrient solution has a formula: in mass concentration, ammonium nitrate: 430 mg/L to 450 mg/L, dipotassium phosphate: 90 mg/L to 100 mg/L, magnesium sulfate: 180 mg/L to 200 mg/L, potassium sulfate: 130 mg/L to 140 mg/L, ferrous sulfate: 50 mg/L to 60 mg/L, ethylenediaminetetraacetic acid (EDTA) disodium salt dihydrate: 60 mg/L to 70 mg/L, calcium chloride: 220 mg/L to 240 mg/L, and trace elements: boric acid: 1.3 mg/L to 1.5 mg/L, manganese chloride tetrahydrate:

0.80 mg/L to 0.90 mg/L, copper sulfate pentahydrate: 0.070 mg/L to 0.080 mg/L, zinc chloride: 0.10 mg/L to 0.30 mg/L, and sodium molybdate dihydrate: 0.020 mg/L to 0.030 mg/L; and the phosphorus-free aeroponic nutrient solution has a formula: in mass concentration, ammonium nitrate: 430 mg/L to 450 mg/L, potassium nitrate: 75.0 mg/L to 85.0 mg/L, magnesium sulfate: 180 mg/L to 200 mg/L, potassium sulfate: 130 mg/L to 140 mg/L, ferrous sulfate: 50 mg/L to 60 mg/L, EDTA disodium salt dihydrate: 60 mg/L to 70 mg/L, calcium chloride: 220 mg/L to 240 mg/L, and trace elements: boric acid: 1.3 mg/L to 1.5 mg/L, manganese chloride tetrahydrate: 0.80 mg/L to 0.90 mg/L, copper sulfate pentahydrate: 0.070 mg/L to 0.080 mg/L, zinc chloride: 0.10 mg/L to 0.30 mg/L, and sodium molybdate dihydrate: 0.020 mg/L to 0.030 mg/L.

6. The method for efficiently collecting and purifying *O. cumana* germination stimulants using aeroponics and SPE according to claim 2, wherein, in step (2), the SPE cartridge is connected to a water pump, and both are immersed in the aeroponic nutrient solution inside a cultivation bucket for SPE.

7. The method for efficiently collecting and purifying *O. cumana* germination stimulants using aeroponics and SPE according to claim 6, wherein, in step (2), the SPE cartridge is aC18 reversed-phase extraction column.

8. The method for efficiently collecting and purifying *O. cumana* germination stimulants using aeroponics and SPE according to claim 7, wherein, the SPE comprises the following steps:
(a) activating a C18 reverse-phase extraction column with methanol and water sequentially to give an activated C18 reverse-phase extraction column;
(b) connecting the C18 reverse-phase extraction column to the water pump, and immersing the two in the aeroponic nutrient solution in the cultivation bucket together; starting the water pump to pump an aeroponic nutrient solution in the cultivation bucket into the SPE cartridge for collecting *O. cumana* germination stimulants; and loading, rinsing, and eluting with acetone sequentially to give crude *O. cumana* germination stimulants;
(c) activating a silica column with ethyl acetate and n-hexane sequentially to give an activated silica column; and
(d) dissolving the crude *O. cumana* germination stimulants obtained in step (b) in a mixture of ethyl acetate and n-hexane with volume ratio of 1:(80-100); passing a resulting solution through the silica column, and eluting the silica column with n-hexane and a mixture of n-hexane and ethyl acetate with volume ratio of 1:(8-9) sequentially; and centrifuging and concentrating to give *O. cumana* germination stimulants.

* * * * *